INVENTOR
ROBERT FEUER
BY Arthur Frailich
ATTORNEY

INVENTOR
ROBERT FEUER
BY Arthur Frealich
ATTORNEY

United States Patent Office 3,447,137

Patented May 27, 1969

3,447,137

DIGITAL MEMORY APPARATUS

Robert Feuer, Canoga Park, Calif., assignor to The Bunker-Ramo Corporation, Stamford, Conn., a corporation of Delaware Filed May 13, 1965, Ser. No. 455,546
Int. Cl. G11b; H03k 3/26, 15/00
U.S. Cl. 340—173 19 Claims

ABSTRACT OF THE DISCLOSURE

A very fast low power semiconductor memory cell. The memory cell includes first and second metal oxide semiconductors which are interconnected such that when the first semiconductor is conducting, it holds the second semiconductor off and vice versa. Additionally, third and fourth metal oxide semiconductors are connected to the first and second semiconductors in a manner which enables them to function as high valued resistors. Further, first and second metal oxide output semiconductors are provided which are respectively connected to the first and second semiconductors with the drain terminals of the output semiconductors serving as both input terminals and complementary output terminals for the memory cell. In writing information into the cell, complementary data signals are provided to the output semiconductors to promptly force the nodes of both the first and second semiconductors to their new potential levels without waiting for regeneration to occur in the cell.

This invention relates generally to digital memory apparatus and more particularly to very fast low power semiconductor memory cells.

Many different types of discrete digital memory cells have been developed in recent years and each possesses certain characteristics which are either advantageous or disadvantageous in particular environments. Thus, for example, magnetic core elements have been employed where reasonably fast and large and moderately priced storage is desired. Most types of magnetic cores are however of the destructive readout type. Transistor flip-flops on the other hand are often employed where fast, small nondestructive readout memories are needed and where a greater cost per bit ratio can be tolerated. Because prior art transistor flip-flops require a relatively large amount of steady state power to retain their storage, as compared to magnetic cores which require no steady state power, transistor flip-flops cannot normally be used in certain environments where power requirements are critical.

In accordance with the present invention, a semiconductor flip-flop is provided which requires very little steady state power as compared to prior art circuits, thereby permitting its use in environments where previous semiconductor circuits could not be employed. In addition to having very low power requirements, the circuits provided in accordance with the present invention can be switched very rapidly and read nondestructively.

Whereas magnetic cores have in the past been significantly less expensive than semiconducting circuits, recent advances in integrated circuit fabrication techniques give promise of significantly reducing the cost of future semiconductor circuits. One recently developed field effect semiconductor which can be fabricated using integrated circuit deposition techniques is a metal oxide semiconductor (MOS) in which the potential on a gate terminal controls current between a source terminal and a drain terminal. The gate terminal does not however draw current and therefore less steady state power is required than in comparable transistors where a steady state base current must be supplied.

Briefly, in accordance with the present invention, a memory cell is provided including first and second semiconductors, preferably metal oxide semiconductors, which are interconnected such that when the first semiconductor is conducting, it holds the second semiconductor off and vice versa. In accordance with one feature of the present invention, third and fourth semiconductors, also preferably metal oxide semiconductors, are respectively connected to the first and second semiconductors and are connected so as to function as high valued resistors. In accordance with a second feature of the invention, first and second output switches, also preferably metal oxide semiconductors, are respectively connected to the first and second semiconductors with the drain terminals thereof serving as both input terminals and complementary output terminals for the memory cell. In writing information into the memory cell, complementary data signals are provided to the output semiconductors to promptly force the nodes of both the first and second semiconductors to their new potential levels without waiting for regeneration to occur in the cell. Thus, the cell can be switched very rapidly and since regeneration is not relied upon for switching, the steady state currents required within the cell can be kept to a minimum thereby of course minimizing power dissipation. Power dissipation is further minimized by the fact that the sense amplifiers present a low impedance and thus both data lines after a read operation are at substantially the same potential thereby requiring the potential of only one of the data lines to be moved during a subsequent write operation regardless of which bit is being written.

Memory cells constructed in accordance with the present invention find utility wherever a binary storage cell is required but however embodiments of the invention find particular utility in both linear select and content addressable memory systems. Linear select systems are well known in the prior art. A typical content addressable memory system is disclosed in U.S. Patent 3,031,650.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1(*a*) is a diagram illustrating the symbol used to represent a metal oxide semiconductor device;

FIG. 1(*b*) comprises a chart illustrating characteristics of a typical enhancement mode metal oxide semiconductor device;

Figure 1A:
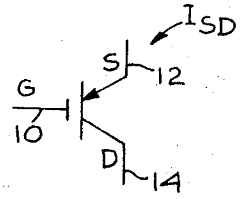
Figure 1B:
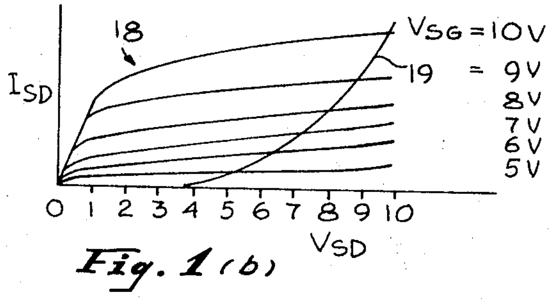

Attention is initially called to FIGS. 1(*a*)–(*b*) which symbolically illustrate a metal oxide semiconductor and its operational characteristics. A semiconductor of this type is discussed in detail in "IEEE Transactions on Electronic Devices," July 1964, pages 324–345. Its characteristics will only be briefly considered herein.

The metal oxide semiconductor as shown in FIG. 1(*a*) includes a gate or control terminal 10, a first current conducting terminal or source terminal 12, and a second current conducting terminal or drain terminal 14. The illustrated semiconductor is a bilateral device and as a matter of fact is usually substantially symmetric so that the source and drain terminals are effectively interchangeable. FIG. 1(*b*) is a chart plotting the current ($I_{SD}$) through the source and drain terminals as a function of the source-drain potential ($V_{SD}$) and illustrates a family of operational curves for different constant values of source-gate potential ($V_{SG}$). It can be seen that for the semiconductor illustrated a 5 volt threshold level from source to gate has been assumed. Note that for any value of $V_{SG}$ the current $I_{SD}$ increases rapidly for low values of $V_{SD}$ prior to a knee 18 in the characteristic curves. After the voltage $V_{SD}$ is increased to beyond the knee 18, the current $I_{SD}$ increases only very slightly as $V_{SD}$ is increased. If the drain terminal 14 is connected to the gate terminal 10, the value $V_{SD}$ will of course always equal $V_{SG}$. By plotting these points on the family of curves shown in FIG. 1(*b*), a curve 19 is developed which represents the current $I_{SD}$ versus $V_{SD}=V_{SG}$. From the nature of curve 19, it can be seen that the semiconductor of FIG. 1(*a*) can function as a nonlinear resistor by directly connecting the drain and gate terminals.

Figure 2:
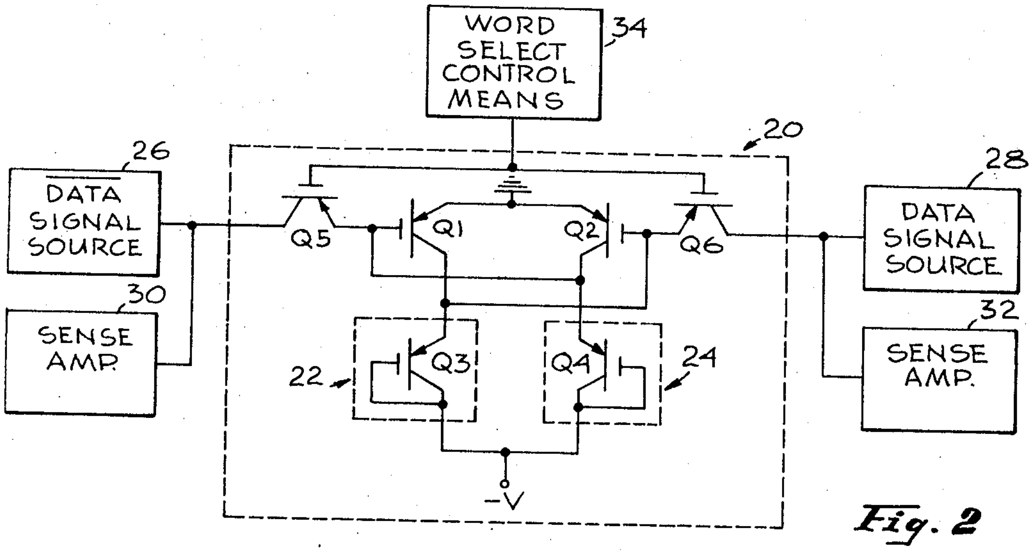
FIG. 2 is a schematic diagram of a basic memory cell constructed in accordance with the present invention.

With the foregoing operational characteristics described by FIG. 1(*b*) in mind, attention is now called to FIG. 2 which schematically illustrates a binary memory cell 20 which employs metal oxide semiconductors of the type illustrated in FIG. 1. The memory cell 20 includes first and second metal oxide semiconductors Q1 and Q2 each of which includes gate, source, and drain terminals. As will be seen hereinafter, the semiconductors Q1 and Q2 are interconected to form a bistable circuit such that when semiconductor Q2 is forward biased, semiconductor Q1 is off biased and conversely when semiconductor Q1 is forward biased, semiconductor Q2 is off biased. The source terminals of semiconductors Q1 and Q2 are connected together and to a first source of reference potential, herein illustrated as ground. The drain terminal of semiconductor Q2 is connected to the gate terminal of semiconductor Q1 and the drain terminal of semiconductor Q1 is connected to the gate terminal of semiconductor Q2. The drain terminals of semiconductors Q1 and Q2 are respectively connected through impedances 22 and 24 to a second source of reference potential herein illustrated as —V.

As illustrated in FIG. 1(*b*), a semiconductor of the type shown in FIG. 1(*a*) can be connected to function as a resistor. Thus, the impedances 22 and 24 respectively comprise metal oxide semiconductors Q3 and Q4 each having gate, source, and drain terminals. The drain and gate terminals of both semiconductors Q3 and Q4 are interconnected. In addition, the drain terminals of semiconductors Q3 and Q4 are both connected to the second source of reference potential —V. The source terminals of semiconductors Q3 and Q4 are respectively connected to the drain terminals of semiconductors Q1 and Q2.

The circuit thus far described is bistable, defining a first or binary "1" state when semiconductors Q1 and Q3 are conducting and a second or binary "0" state when semiconductors Q2 and Q4 are conducting. The circuit can be demonstrated to be bistable by initially considering that semiconductors Q1 and Q3 are conducting current. In this state, semiconductor Q1 supplies sufficient current to semiconductor Q3 to raise the potential on the gate terminal of semiconductor Q2 to a value close to ground (semiconductor Q1 is operating around knee 18 of FIG. 1(*b*). Consequently, $V_{SG}$ for semiconductor Q2 is considerably less than the 5.0 v. threshold required to make semiconductor Q2 conduct. Thus semiconductor Q2 is off biased and is unable to supply current to semiconductor Q4. Semiconductor Q4, acting as a resistor, biases the gate terminal of semiconductor Q1 to —V, which being greater than the 5.0 v. threshold maintains semiconductor Q1 on. Should semiconductors Q2 and Q4 be on to define binary "0" semiconductors Q1 and Q3 would be held off in an analogous manner.

First and second output metal oxide semiconductors Q5 and Q6, each having gate, source and drain terminals are also provided. The source terminals of semiconductors Q5 and Q6 are respectively connected to the gate terminals of semiconductors Q1 and Q2. The drain terminals of semiconductors Q5 and Q6 are respectively connected to the output terminals of data signal sources 26 and 28 which respectively provide complementary output signals. More particularly, the data signal sources can selectively apply either ground or a negative (—V) potential through a high impedance to the drain terminals of semiconductors 5 and Q6. The drain terminals of semiconductors Q5 and Q6 are additionally connected respectively to sense amplifiers 30 and 32. The gate terminals of semiconductors Q5 and Q6 are connected together to the output of word select control means 34.

It has already been demonstrated that the circuit of FIG. 2 exhibits bistable characteristics. In order to write information into the circuit of FIG. 2, the output semiconductors Q5 and Q6 are employed to force all of the significant circuit nodes to their new potential level. More particularly, the semiconductors Q5 and Q6 force the circuit nodes to their new potentials without relying on regeneration within the circuit for switching. Consider initially for example that it is desired to write a "1." In order to do this, the output of the data signal source 28 is held at ground and the output of the data signal source 26 is caused to fall —V. The word select control means 34 provides a negative going write pulse falling from approximately ground potential to —V. As a consequence, semiconductor Q5 is turned on, assuming that the circuit is presently storing a binary "0," thereby forcing the gate terminal of semiconductor Q1 to a potential close to —V thus turning semiconductor Q1 on. In adition, the source terminal of semiconductor Q4 is forced to a potential close to —V thus cutting semiconductor Q4 off. Further, the gate terminal of semiconductor Q2 is driven to ground through the reverse gain of semiconductor Q6 by data signal source 28 thereby cutting off semiconductor Q2. Inasmuch as semiconductor Q2 is being positively cut off, it is thus easier for semiconductor Q5 to turn on semiconductor Q1. Conversely, in order to write a binary "0" and assuming the circuit to presently store a binary "1," the output of the data signal source 28 is caused to fall to —V while the output of the data signal source 26 is maintained at ground. When the word select control means 34 applies a negative going write pulse to the gate terminals of semiconductors Q5 and Q6, semiconductor Q6 will therefore apply a negative potential to the gate terminal of semiconductor Q2 thus turning semiconductor Q2 on and semiconductor Q5 will apply positive potential to the gate terminal of semiconductor Q1 thus turning it off. Accordingly, it can be seen that the data input signals function to positively turn one of the circuit branches on and one of the circuit branches off. In other words, regeneration is not relied upon to switch the circuit. That is, whereas in conventional bistable state circuits, an output signal derived from the on-going circuit branch is relied upon to cut off the other circuit branch no such output signal is relied on in the present circuit. The significant advantage gained herein by avoiding the necessary of relying on regeneration is that the current flowing through semiconductors Q3 and Q4 can thus be kept very small inasmuch as they serve only to maintain a new state once it is established and are not required for helping to establish the new state. As a consequence of minimizing these current levels, the power dissipation within the circuit is extremely low. As an example, high speed memory cells have been built having a DC power dissipation of less than .1 milliwatt.

In order to read the state of the memory cell 20 of FIG. 2, data signal sources 26 and 28 respectively supply negative potentials to the drain terminals of semiconductors Q5 and Q6. A negative going read pulse having a magnitude greater than the semiconductor threshold levels is provided by the word select control means 34. Assuming that the cell defines a binary "1" and semiconductor Q1 is conducting, a current will thus be diverted through forward biased semiconductor Q6 and as a consequence, the sense amplifier 32 will see a positive going signal. On the other hand, if a binary "0" had been stored and semiconductor Q2 had been conducting, a current would be diverted through semiconductor Q5 meaning that sense amplifier 30 would see a positive going signal. It should be noted that because of the source-to-gate threshold level necessary to keep semiconductors Q5 and Q6 on, it is impossible to change the state of the cell during a read operation, regardless of how negative the output signals from the data signal sources are made. That is, the source terminals of semiconductors Q5 and Q6 could not go sufficiently negative to switch the state of the cell inasmuch as the semiconductors Q5 and Q6 would be cut off prior to this point. Thus, the cell is immune to the effects of external capacitance. It is pointed out that each of the sense amplifiers 30 and 32 is constructed so as to present a low impedance to the cell. At the end of a write operation, the sense amplifiers provide a negative potential to the drain terminals of both semiconductors Q5 and Q6. In order to subsequently write therefore only one of the drain terminals has to be made positive. It is important that the sense amplifiers present a low impedance for if they presented a high impedance, one of the drain terminals would be at a relatively high potential at the end of a read operation thereby requiring the expenditure of more power if an opposite write condition is required thereafter.

Figure 3:
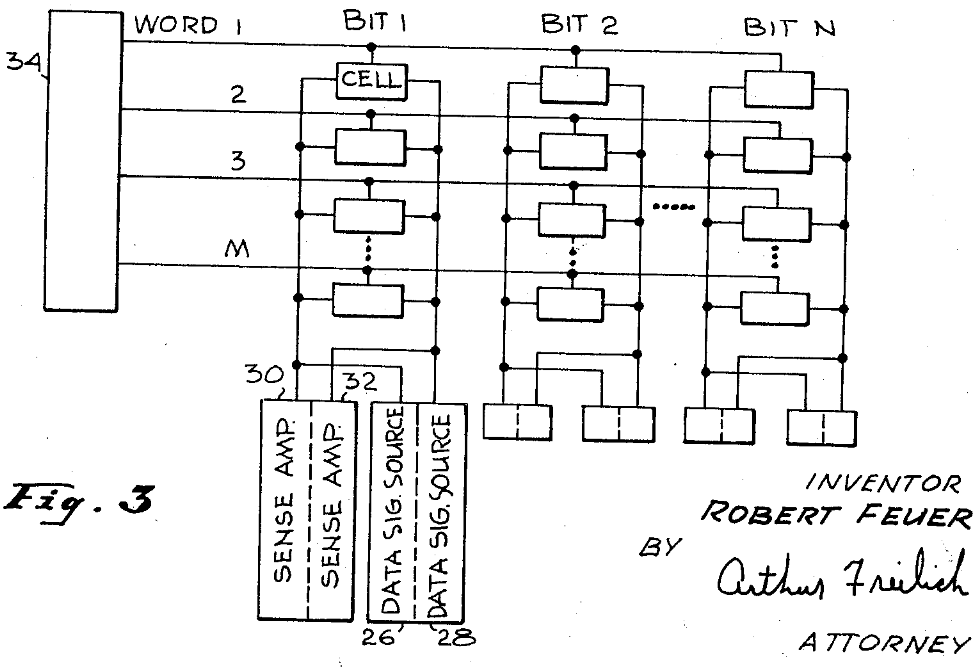
FIG. 3 is a block diagram illustrating a linear select memory comprised of a plurality of memory cells of the type illustrated in FIG. 2.

Attention is now called to FIG. 3 which illustrates a linear select memory incorporating a plurality of memory cells of the type illustrated in FIG. 2. More particularly, MN memory cells are arranged in M groups or word locations, each location including N cells. All of the cells of each location are connected to a common word line constituting one of M output terminals of a word select control means 34. All of the corresponding cells in each word location are connected to the data signal sources and sense amplifiers as illustrated. In the operation of the memory of FIG. 3, information can be selectively written into or read from a particular word location by applying the aforedescribed read and write pulses to the corresponding control means 34 output terminal.

Figure 4:
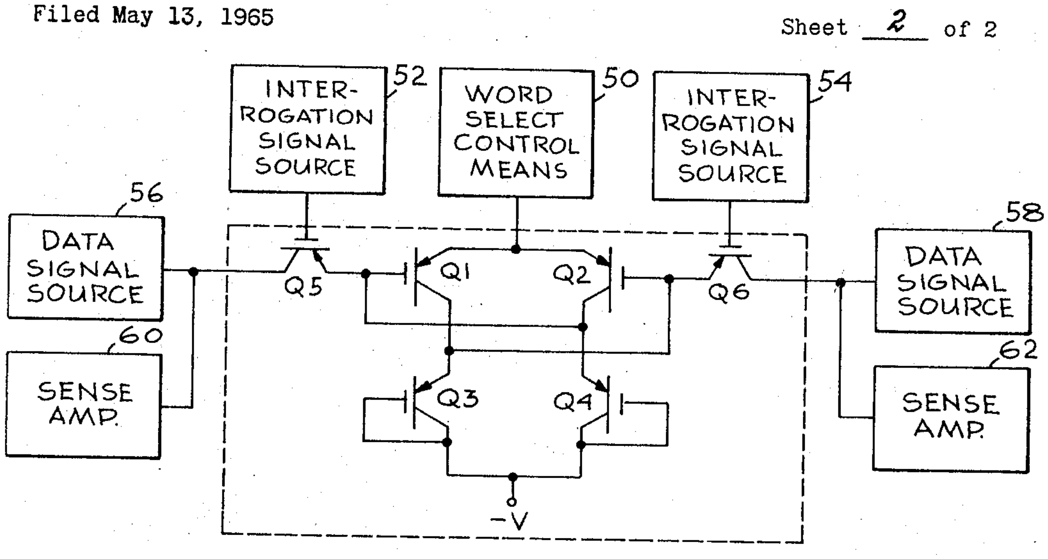
FIG. 4 is a schematic diagram illustrating a basic memory cell in accordance with the invention which finds particular utility in content addressable memory systems.
Figure 5:
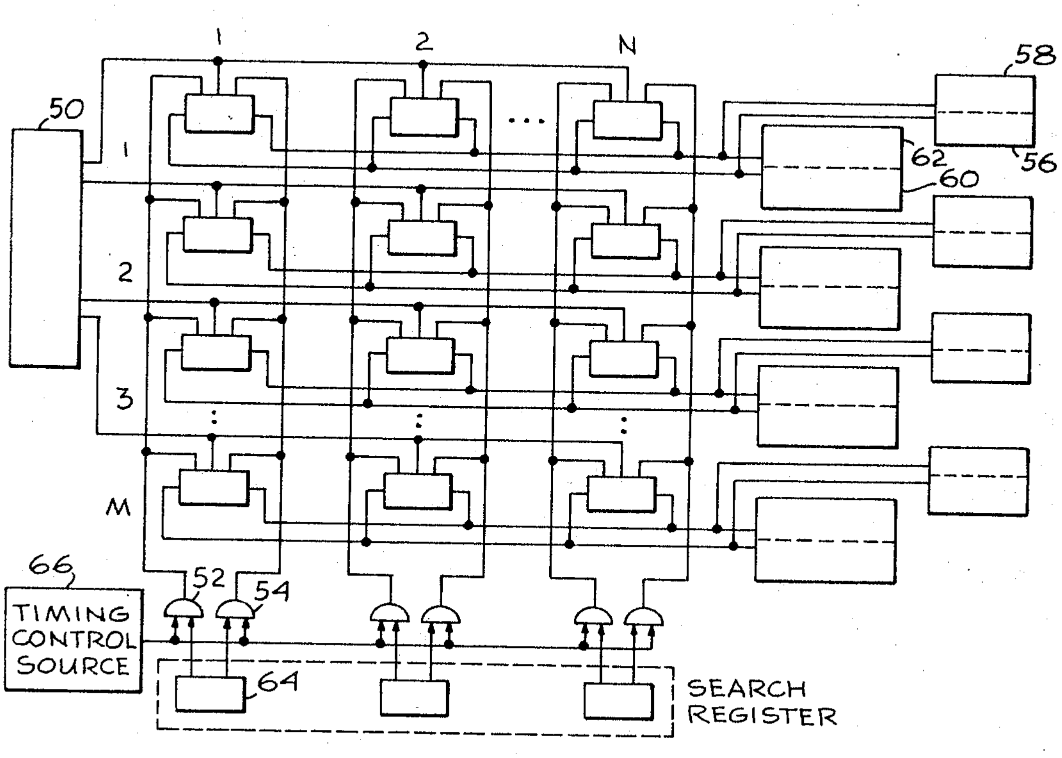
FIG. 5 is a block diagram of a content addressable memory system employing a plurality of memory cells of the type illustrated in FIG. 4.

Attention is now called to FIGS. 4 and 5 which illustrate an additional significant application of a memory cell constructed in accordance with the present invention. The application is in content addressable memory systems of the type described in U.S. Patent No. 3,031,650. Essentially, in a content addressable memory, information can be located on the basis of its content, rather than on the basis of its physical location in the memory. Content addressable memories operate by simultaneously comparing a search word with each of the words stored in memory. More particularly, each bit of a search word is simultaneously compared with a corresponding bit in each of the words stored in the memory. In each case where a stored bit does not match the corresponding search word bit, a mismatch signal is generated by each memory cell storing a mismatching bit. All of the cells in each location are connected together so that the appearance of a mismatch signal from any one of the cells indicates that the word stored in that location does not match the search word. If none of the cells in any one memory location provide a mismatch signal, then it is apparent that the word stored in that location matches the search word.

It is important that a memory cell have at least two characteristics if it is to be used in a content addressable memory. Initially, it should be capable of being interrogated nondestructively and secondly, it should with a minimum amount of hardware be responsive to a binary interrogation signal for providing a mismatch signal in the event it stores a bit different from that represented by the interrogation signal. The cell of FIG. 4 possesses both these characteristics and is illustrated in a content addressable memory in FIGURE 5.

It will be noted that the circuit of FIG. 4 is constructed identically to the circuit of FIG. 2 except however that the source terminals of semiconductors Q1 and Q2, instead of being connected directly to a first source of reference potential, are connected to a word select control means 50. The gate terminals of semiconductors Q5 and Q6 in lieu of being connected together to the word select control means 34 as shown in FIG. 2, are respectively connected to sources of first and second binary interrogation signals 52 and 54. The drain terminal of semiconductor Q5 is connected to a data signal source 56 and a sense amplifier 58. Similarly, the drain terminal of semiconductor Q6 is connected to a data signal source 60 and a sense amplifier 62.

In the operation of the circuit of FIG. 4, consider initially that the cell stores a binary "1" meaning that semiconductor Q1 is conducting and semiconductor Q2 is cut off. In order to interrogate the cell for a "1," the output of the word select control means 50 is held at ground and the output of the source 52 of first interrogation signals is forced to a negative potential greater than the threshold level of semiconductor Q5. The output of the data signal sources 56 and 58 connected respectively to the drain terminals of semiconductors Q5 and Q6 maintain the sense amplifiers 60 and 62 input terminals at —V. Since the gate terminal of semiconductor Q1 resides at approximately —V when Q1 is conducting, semiconductor Q5 will not be forward biased and therefore no signal will appear at the sense amplifier 60. When the cell is being interrogated for a "1," the output of the source 54 of second interrogation signals is held at ground and thus semiconductor Q6 remains cut off and no signal appears at the sense amplifier 62.

Consider now that the cell is being interrogated for a "1" and it is storing a "0" meaning that semiconductor Q2 is conducting and semiconductor Q1 is cut off. The output of the word select control means 50 is held at ground and the output of interrogation signal source 52 is driven negative greater than the threshold level. Consequently, semiconductor Q5 becomes forward biased since the semiconductor Q2 drain terminal is at ground thereby drawing current from semiconductor Q2. Consequently, sense amplifier 60 will see a positive going signal constituting a mismatch signal.

On the other hand, assume the cell is being interrogated for a binary "0" which requires that the output control means 50 is held at ground while the output of source 54 is forced negative. If the cell is storing a "0" meaning that semiconductor Q2 is conducting, sense amplifier 62 will see no change at its input when the output from interrogation signal source 54 is driven negative. However, if the cell is storing a "1," meaning that semiconductor Q1 is conducting, semiconductor Q6 will be forward biased in response to a negative signal applied to the gate terminal thereof by interrogation source 54 and the sense amplifier 62 in turn will see a positive going signal constituting a mismatch signal.

FIG. 5 illustrates MN memory cells arranged in M word locations each comprised of N memory cells. As shown in FIG. 5, the interrogation signal sources 52 and 54 can comprise AND gates respectively having inputs derived from the complementary outputs of a search register stage 64 which can comprise any bistable state circuit providing complementary outputs. The gates 52 and 54 can be gated by a signal provided by a timing control source 66. It should be noted that the outputs of the interrogation signal sources from each stage of the search register, i.e. the AND gates 52 and 54, are similarly connected to the corresponding cell in each of the M memory locations. It also should be noted that all of the semiconductor Q6 drain terminals in the same word location are connected in common to the sense amplifier 62 while all of the semiconductor Q5 drain terminals are connected in common to the sense amplifier 60. It should be appreciated that in searching the memory, interrogation signals are provided from the sources 52 and 54 simultaneously to all of the N bit positions in the memory. The consequent generation of positive going mismatch signals appearing at the input of sense amplifier 60 or 62 of course indicates that the word stored in the location associated with those sense amplifiers does not match the word stored in the search register comprised of flip-flop stages 64.

Information can be selectively written into or read from a location of the content addressable memory of FIG. 5 by causing the word select control means 50 to select the particular location to be operated upon. Thus, in order to write information into a selected memory location, the word line associated with that location is held at ground while all of the other word lines in the memory are forced sufficiently negative to prevent any of the cells thereof from switching.

Data is then written into the memory cells of the selected word location in two steps: initially all of the "1's" are written and secondly all of the "0's" are written. The "1's" are written by causing the output data signal sources 56 and 58 to respectively fall to −V and remain at ground while the sources 52 corresponding to each bit position in which a "1" is to be written are caused to provide a negative potential. Thus, in each cell of the selected location in which a "1" is to be written semiconductor Q5 is forward biased to accordingly turn on semiconductor Q1 and cut off semiconductor Q2.

The "0's" can next be written by causing the output of data signal sources 56 and 60 to respectively remain at ground and fall to −V. Sources 54 associated with those cells into which "0's" are to be written are then caused to go negative to thus forward bias semiconductor Q6 in those cells and consequently turn semiconductor Q1 off and semiconductor Q2 on.

The contents of a given address can be read in a serial fashion by activating the word select line and interrogating each bit by exciting the interrogation signal source 54 sequentially. A signal out indicates that bit is a "1."

From the foregoing, it should be appreciated that a semiconductor memory cell has been disclosed herein which can be read nondestructively and which can be operated very rapidly at low steady state power levels. Low power consumption and rapid switching are assured by positively switching both branches of the memory cell rather than relying on regeneration for switching. Much lower steady state current levels can be tolerated if regeneration is not required for switching.

It is also pointed out that circuits constructed in accordance with the present invention can be fabricated relatively inexpensively inasmuch as they are comprised of a plurality of identical elements, i.e. metal oxide semiconductors whose fabrication is readily adaptable to integrated circuit techniques. The use of identical elements in the circuit is permitted as a consequence of forming necessary circuit impedances using metal oxide semiconductors.

The embodiments of the invention in which an exclusive property or privilege is claimed are defined as follows:

1. A flip-flop circuit comprising:
   a first field effect semiconductor having gate, source, and drain terminals;
   a second field effect semiconductor having gate, source, and drain terminals;
   a first source of reference potential;
   means connecting each of said source terminals to said first source of reference potential;
   a second source of reference potential;
   a first impedance connecting said first semiconductor drain terminal to said second source of reference potential;
   a second impedance connecting said second semiconductor drain terminal to said second source of reference potential;
   means connecting said first semiconductor drain terminal to said second semiconductor gate terminal for holding said second semiconductor cut off when said first semiconductor is conducting;
   means connecting said second semiconductor drain terminal to said first semiconductor gate terminal for holding said first semiconductor cut off when said second semiconductor is conducting; and
   means for selectively forward biasing either said first or second semiconductors while simultaneously off biasing the other semiconductor.

2. The circuit of claim 1 wherein each of said semiconductors comprises a metal oxide semiconductor.

3. The circuit of claim 1 wherein each of said first and second impedances comprises a field effect semiconductor having gate, source, and drain terminals;
   means respectively connecting said first impedance source and drain terminals to said first semiconductor drain terminal and said second source of reference potential respectively;
   means respectively connecting said second impedance source and drain terminals to said second semiconductor drain terminal and said second source of reference potential; and
   means connecting said first impedance drain terminal to said first impedance gate terminal and said second impedance drain terminal to said second impedance gate terminal.

4. The circuit of claim 3 wherein each of said first and second impedances comprises a metal oxide semiconductor.

5. The circuit of claim 1 wherein said first and second semiconductor gate and drain terminals reside at first potential levels when said first semiconductor is conducting and at second potential levels when said second semiconductor is conducting; and wherein
   said means for forward biasing said first and second semiconductors includes a potential level source and first and second switches for respectively connecting said first and second semiconductor gate and drain terminals to said potential level source for directly applying said first potential levels thereto in order to forward bias said first semiconductor and said second potential levels thereto in order to forward bias said second semiconductor.

6. The circuit of claim 5 wherein each of said first and second switches comprises a field effect semiconductor having gate, source, and drain terminals;
   means connecting said first switch source terminal to said first semiconductor gate terminal;

means connecting said second switch source terminal to said second semiconductor gate terminal;

a control signal source; and means connecting said control signal source to said first and second switch gate terminals.

7. The circuit of claim 6 wherein each of said first and second impedances comprises a field effect semiconductor having gate, source, and drain terminals;

means respectively connecting said first impedance source and drain terminals to said first semiconductor drain terminal and said second source of reference potential respectively;

means respectively connecting said second impedance source and drain terminals to said second semiconductor drain terminal and said second source of reference potential; and means connecting said first impedance drain terminal to said first impedance gate terminal and said second impedance drain terminal to said second impedance gate terminal.

8. The circuit of claim 7 wherein each of said field effect semiconductors comprises a metal oxide semiconductor.

9. A binary memory cell comprising:

first and second semiconductor devices each including a control terminal and first and second current conducting terminals;

a first source of reference potential;

means connecting each of said first current conducting terminals to said first source of reference potential;

a second source of reference potential;

a first impedance connecting said first semiconductor second current conducting terminal to said second source of reference potential;

a second impedance connecting said second semiconductor second current conducting terminal to said second source of reference potential;

means connecting said first semiconductor second current conducting terminal to said second semiconductor control terminal for holding said second semiconductor cut off when said first semiconductor is conducting;

means connecting said second semiconductor second current conducting terminal to said first semiconductor control terminal for holding said first semiconductor cut off when said second semiconductor is conducting; and data control means for selectively applying forward and off biasing binary data signals to said first and second semiconductors, said data control means including first and second complementary data signal sources and first and second switches for respectively connecting said first and second semiconductors to said first and second data signal sources.

10. The memory cell of claim 9 wherein each of said first and second switches comprises a metal oxide semiconductor having gate, source, and drain terminals;

means connecting said first switch source terminal to said first semiconductor second current conducting terminal;

means connecting said second switch source terminal to said second semiconductor second current conducting terminal;

a source of control signals; and means connecting said source of control signals to said first and second switch gate terminals.

11. A digital memory comprising:

MN memory cells arranged to define M groups each including N memory cells, each of said memory cells including:

a first metal oxide semiconductor having gate, source, and drain terminals;

a second metal oxide semiconductor having gate, source, and drain terminals;

a first source of reference potential;

means connecting each of said source terminals to said first source of reference potential;

a second source of reference potential;

a first impedance connecting said first semiconductor drain terminal to said second source of reference potential;

a second impedance connecting said second semiconductor drain terminal to said second source of reference potential;

means connecting said first semiconductor drain terminal to said second semiconductor gate terminal for holding said second semiconductor cut off when said first semiconductor is conducting;

means connecting said second semiconductor drain terminal to said first semiconductor gate terminal for holding said first semiconductor cut off when said second semiconductor is conducting;

a first output metal oxide semiconductor having gate, source, and drain terminals;

a second output metal oxide semiconductor having gate, source, and drain terminals;

means connecting said first output semiconductor source terminal to said first semiconductor gate terminal;

means connecting said second output semiconductor source terminal to said second semiconductor gate terminal;

a word select control means having M output terminals;

means connecting each of said word select control means output terminals to all of the output semiconductor gate terminals in a different one of said M groups of memory cells;

a source of data signals; and means commonly connecting corresponding output semiconductor drain terminals in each of said M groups to said source of data signals.

12. The memory of claim 11 wherein each of said first and second impedances comprises a metal oxide semiconductor having gate, source, and drain terminals;

means respectively connecting said first impedance source and drain terminals to said first semiconductor drain terminal and said second source of reference potential respectively;

means respectively connecting said second impedance source and drain terminals to said second semiconductor drain terminal and said second source of reference potential; and means connecting said first impedance drain terminal to said first impedance gate terminal and said second impedance drain terminal to said second impedance gate terminals.

13. A digital memory comprising:

MN memory cells ararnged to define M groups each including N memory cells, each of said memory cells including:

first and second semiconductor devices each including a control terminal and first and second current conducting terminals;

a first source of reference potential;

means connecting each of said first current conducting terminals to said first source of reference potential;

a second source of reference potential;

a first impedance connecting said first semiconductor second current conducting terminals to said second source of reference potential;

a second impedance connecting said second semiconductor second current conducting terminal to said second source of reference potential;

means connecting said first semiconductor second current conducting terminal to said second semiconductor control terminal for holding said second semiconductor cut off when said first semiconductor is conducting;

means connecting said second semiconductor second current conducting terminal to said first semiconductor control terminal for holding said first semiconductor cut off when said second semiconductor is conducting;

first and second switches respectively connected to said first and second semiconductors;

a word select control means have M output terminals;

means connecting each of said word select control means output terminals to all of the switches in a different one of said M groups of memory cells;

first and second sources of complementary data signals; and means respectively connecting all of said first and second switches in corresponding memory cells in each of said M groups to said first and second sources of data signals.

14. The memory of claim 13 wherein each of said first and second switches comprises a metal oxide semiconductor having gate, source, and drain terminals;

means connecting said first switch source terminal to said first semiconductor second current conducting terminal;

means connecting said second switch source terminal to said second semiconductor second current conducting terminal;

a source of control signals; and means connecting said source of control signals to said first and second switch gate terminals.

15. In a content addressable memory including means for generating first and second binary interrogation signals, a binary memory cell responsive to said first interrogation signal for providing an output signal when the cell defines a second state and responsive to said second interrogation signal for providing an output signal when the cell defines a first state, said memory cell comprising:

first and second semiconductor devices each including a control terminal and first and second current conducting terminals;

a first source of reference potential;

means for connecting each of said first current conducting terminals to said first source of reference potential;

a second source of reference potential;

a first impedance connecting said first semiconductor second current conducting terminal to said second source of reference potential;

a second impedance connecting said second semiconductor second current conducting terminal to said second source of reference potential;

means connecting said first semiconductor second current conducting terminal to said second semiconductor control terminal for holding said second semiconductor cut off when said first semiconductor is conducting;

means connecting said second semiconductor second current conducting terminal to said first semiconductor control terminal for holding said first semiconductor cut off when said second semiconductor is conducting;

a first output semiconductor having a control terminal and first and second current conducting terminals;

means connecting said first output semiconductor first current conducting terminal to said first semiconductor control terminal;

a second output semiconductor having control and first and second current conducting output terminals;

means connecting said second output semiconductor first current conducting terminal to said second semiconductor control terminal;

means for applying said first interrogation signal to said first output semiconductor control terminal whereby said first output signal will be provided on said first output semiconductor second current conducting terminal if said second semiconductor is conducting; and means for applying said second interrogation signal to said second output semiconductor control terminal whereby said second output signal will be provided on said second output semiconductor second current conducting terminal if said first semiconductor is conducting.

16. The memory of claim 15 including MN memory cells arranged to define M groups each group including N cells;

means connecting all of said first output semiconductor second current conducting terminals in each group in common; and means connecting all of said second output semiconductor second current conducting terminals in each of said groups in common.

17. In a content addressable memory including means for generating first and second binary interrogation signals, a binary memory cell responsive to said first interrogation signal for providing an output signal when the cell defines a second state and responsive to said second interrogation signal for providing an output signal when the cell defines a first state, said memory cell comprising:

first and second semiconductor devices each including a control terminal and first and second current conducting terminals;

a first source of reference potential;

means for connecting each of said first current conducting terminals to said first source of reference potential;

a second source of reference potential;

a first impedance connecting said first semiconductor second current conducting terminal to said second source of reference potential;

a second impedance connecting said second semiconductor second current conducting terminal to said second source of reference potential;

means connecting said first semiconductor second current conducting terminal to second semiconductor control terminal for holding said second semiconductor cut off when said first semiconductor is conducting;

means connecting said second semiconductor second current conducting terminal to said first semiconductor control terminal for holding said first semiconductor cut off when said second semiconductor is conducting;

a first output semiconductor having a control terminal and first and second current conducting terminals;

means connecting said first output semiconductor first current conducting terminal to said first semiconductor control terminal;

a second output semiconductor having control and first and second current conducting output terminals;

means connecting said second output semiconductor first current conducting terminal to said second semiconductor control terminal;

means for applying said first interrogation signal to said first output semiconductor control terminal whereby said first output signal will be provided on said first output semiconductor second current conducting terminal if said second semiconductor is conducting;

means for applying said second interrogation signal to said second output semiconductor control terminal whereby said second output signal will be provided on said second output semiconductor second current conducting terminal if said first semiconductor is conducting;

a word select control means having M output terminals; and means connecting all of said first and second semiconductor first current conducting terminals in each group to a different one of said word select means output terminals.

18. The memory of claim 17 wherein each of said first and second semiconductors and said first and second output semiconductors comprises a metal oxide semiconductor and wherein said control terminals constitute gate terminals and said first and second current conducting terminals respectively constitute source and drain terminals.

19. A binary memory cell comprising:

first and second semiconductors each capable of either being forward biased or off biased;

means interconnecting said first and second semiconductors for holding said first semiconductor off biased in response to said second semiconductor being forward biased and for holding said second semiconductor off biased in response to said first semiconductor being forward biased; and data control means for selectively applying forward and off biasing binary data signals to said first and second semiconductors, said data control means including first and second complementary data signal sources and first and second switches for respectively connecting said first and second semiconductors to said first and second data signal sources.

References Cited

UNITED STATES PATENTS

| | | | |
|---|---|---|---|
| 3,355,721 | 11/1967 | Burns | 340—173 |
| 3,363,115 | 1/1968 | Stephenson | 307—279 |

TERRELL W. FEARS, *Primary Examiner.*

U.S. Cl. X.R.

307—279